United States Patent Office 3,262,945
Patented July 26, 1966

3,262,945
N-(4-PROPYL-L-HYGROYL) LINCOSAMINE PHENYLOSAZONE
William Schroeder, Pavilion Township, Kalamazoo County, Mich., assignor to The Upjohn Company, Kalamazoo, Mich., a corporation of Delaware
No Drawing. Filed May 14, 1964, Ser. No. 367,559
3 Claims. (Cl. 260—326.3)

This invention relates to a novel composition of matter and to a process for the preparation thereof, and is particularly directed to N-(4-propyl-L-hygroyl)lincosamine phenylosazone (II), and to a process for producing the same.

The novel compound of this invention and the process for the production thereof can be illustratively represented in the following manner:

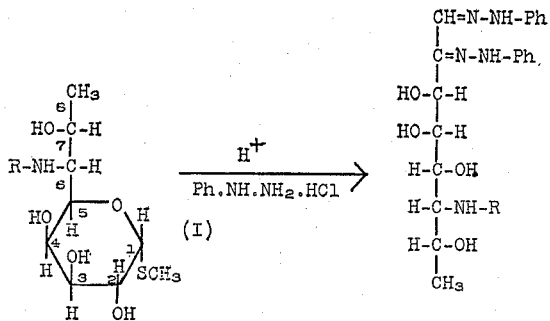

wherein R is trans-4-propyl-L-hygroyl; and Ph is phenyl.

The process of the present invention comprises hydrolyzing lincomycin with a mineral acid, for example, hydrochloric, sulfuric, and the like, and then treating the hydrolysate with an excess of phenylhydrazine. The acidic hydrolysis of lincomycin is accompanied initially by the evolution of methyl mercaptan. When the evolution of this gas begins to abate, the hydrolysate is treated with phenylhydrazine to form N-(4-propyl-L-hygroyl)lincosamine phenylosazone. (The methyl mercaptan evolved during the acid hydrolysis can be quantitatively ascertained by collecting the gas and reacting it with mercuric chloride to precipitate $CH_3SHgCl$.) The novel compound of the invention is recovered from the reaction mixture by diluting the mixture with water and a sufficient amount of a water-miscible lower alkanol, for example, methanol, to prevent precipitation of impurities, and then effecting precipitation of the desired product by the addition of an alkali metal hydroxide, for example, potassium hydroxide, lithium hydroxide, or sodium hydroxide, to a pH of about 9 at which point the novel compound N-(4-propyl-L-hygroyl)lincosamine phenylosazone precipitates as a deep yellow material. Recrystallization can be accomplished from a water-miscible lower alkanol, for example, methanol, and water solution to yield yellow needles of N-(4-propyl-L-hygroyl)lincosamine phenylosazone.

The novel compound of the invention, N-(4-phenyl-L-hygroyl)lincosamine phenylosazone, has a broad range of ultraviolet absorptions as follows:

Max.: $E_{1cm}^{1\%}$
257 mμ _____ 350
313 mμ _____ 175
395 mμ _____ 365

N-(4-propyl-L-hygroyl)lincosamine phenylosazone can be used as a filtering agent for ultraviolet light. For this purpose it can be dispersed in plastic films or like transparent vehicles.

The starting material of Formula I, lincomycin, is an antibiotic obtained as an elaboration product of a lincomycin-producing actinomycete. Methods for the production, recovery, and purification of lincomycin are described in U.S. Patent 3,086,912.

The following example is illustrative of the process and product of the present invention but is not to be construed as limiting.

Example 1.—N-(4-propyl-L-hygroyl)linsosamine phenylosazone

A solution of 2 gm. of lincomycin hydrochloride hemihydrate in 10 ml. of 2 N HCl was heated on the steam bath for about 1 hour, (the methyl mercaptan evolved was collected and quantitatively measured by precipitating with mercuric chloride) after which 3 gm. of phenylhydrazine hydrochloride, 4 gm. of sodium acetate, and 20 ml. of water were added. The mixture was heated for an additional 20 minutes, cooled and diluted with water to about 75 ml., and methanol was added to prevent precipitation of impurities. The addition of 50% potassium hydroxide solution to a pH of 9 precipiated a substance which was collected and washed with small amounts of methanol; yield, 150 mg. of N-(4-propyl-L-hygroyl)lincosamine phenylosazone as a deep yellow material. Crystallization from methanol-water afforded yellow needles, which after recrystallization from ethanol-water had a melting point of 216–218° C.

Analysis.—Calcd. for $C_{29}H_{42}N_6O_5$: C, 62.79; H, 7.63; N, 15.15. Found: C, 62.99; H, 7.84; N, 14.64.

I claim:
1. A compound of the formula:

$$\begin{array}{l}CH=N-NH-Ph\\|\\C=N-NH-Ph\\|\\HO-C-H\\|\\HO-C-H\\|\\H-C-OH\\|\\H-C-NH-R\\|\\H-C-OH\\|\\CH_3\end{array} \quad II$$

wherein R is trans-4-propyl-L-hygroyl; and wherein Ph is phenyl.

2. N - (4-propyl-L-hygroyl)lincosamine phenylosazone.

3. A process for the production of a compound of claim 1 which comprises hydrolyzing lincomycin with a mineral acid until the evolution of methyl mercaptan has abated, adding phenylhydrazine to the hydrolysate, and isolating the N-(4-propyl-L-hygroyl)lincosamine phenylosazone so produced.

No references cited.

CHARLES B. PARKER, Primary Examiner.
ROBERT V. HINES, Assistant Examiner.